(12) United States Patent
Kim et al.

(10) Patent No.: US 10,817,192 B2
(45) Date of Patent: Oct. 27, 2020

(54) DATA STORAGE APPARATUS SELECTING MEMORY BLOCK GROUP BASED ON INTERLEAVING INDEX AND OPERATING METHOD THEREOF

(71) Applicant: SK hynix Inc., Gyeonggi-do (KR)

(72) Inventors: Jung Woo Kim, Seoul (KR); Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 248 days.

(21) Appl. No.: 15/980,350

(22) Filed: May 15, 2018

(65) Prior Publication Data

US 2019/0114101 A1  Apr. 18, 2019

(30) Foreign Application Priority Data

Oct. 12, 2017  (KR) .................. 10-2017-0132084

(51) Int. Cl.
*G06F 12/00* (2006.01)
*G06F 3/06* (2006.01)
*G06F 12/06* (2006.01)

(52) U.S. Cl.
CPC ............ *G06F 3/0629* (2013.01); *G06F 3/061* (2013.01); *G06F 3/064* (2013.01); *G06F 3/0616* (2013.01); *G06F 3/0653* (2013.01); *G06F 3/0659* (2013.01); *G06F 3/0679* (2013.01); *G06F 12/0607* (2013.01)

(58) Field of Classification Search
CPC ............ G06F 12/0246; G06F 12/0607; G06F 2212/7201; G06F 2212/7205; G06F 3/061; G06F 3/0616; G06F 3/0629; G06F 3/064; G06F 3/0653; G06F 3/0659; G06F 3/0679

See application file for complete search history.

(56) References Cited

U.S. PATENT DOCUMENTS

2013/0238835 A1 * 9/2013 Liu ..................... G11C 29/883
711/103
2017/0199703 A1 * 7/2017 Ravimohan ......... G06F 12/0607

FOREIGN PATENT DOCUMENTS

KR       101356470       1/2014

* cited by examiner

*Primary Examiner* — John A Lane
(74) *Attorney, Agent, or Firm* — IP & T Group LLP

(57) ABSTRACT

A data storage apparatus includes a nonvolatile memory device including a plurality of memory block groups and a controller configured to, when use of a first memory block group selected from the plurality of memory block groups is completed, select a second memory block group to be used next from among remaining memory block groups, excluding the first memory block group, of the plurality of memory block groups based on interleaving indexes of the remaining memory block groups.

15 Claims, 10 Drawing Sheets

FIG.4A

SBIT

| IL Index | SB No. |
|---|---|
| A | - |
| B | - |
| ⋮ | ⋮ |
| Z | - |

FIG.4B

SBIT

| SB No. | IL Index |
|---|---|
| SB1 | - |
| SB2 | - |
| SB3 | - |
| ⋮ | ⋮ |
| SBm | - |

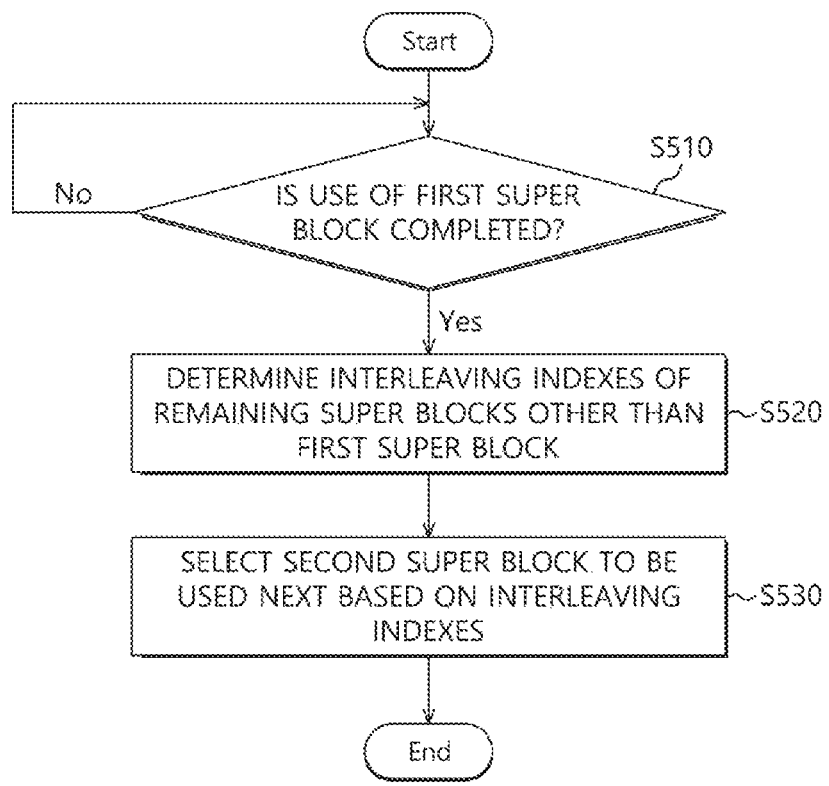

DATA STORAGE APPARATUS SELECTING MEMORY BLOCK GROUP BASED ON INTERLEAVING INDEX AND OPERATING METHOD THEREOF

CROSS-REFERENCE TO RELATED APPLICATION

The present application claims priority under 35 U.S.C. § 119(a) to Korean patent application number 10-2017-0132084, filed on Oct. 12, 2017, in the Korean Intellectual Property Office, which is incorporated herein by reference in its entirety.

BACKGROUND

1. Technical Field

Various embodiments of the present invention generally relate to a semiconductor apparatus. Particularly, the embodiments relate to a data storage apparatus and an operating method thereof.

2. Related Art

The paradigm for computer environments is shifting towards ubiquitous computing, which allows users to use computer systems anytime, anywhere. As a result, use of portable electronic apparatuses such as a mobile phone, a digital camera, and a laptop computer has been increasing rapidly. Generally, portable electronic apparatuses use data storage apparatuses that employ memory devices. Data storage apparatuses may be used to store data used in the portable electronic apparatuses.

Data storage apparatuses using memory devices have no mechanical driving units and exhibit good stability and endurance, fast information access rate, and low power consumption. Such data storage apparatuses may include a universal serial bus (USB) memory device, a memory card having various interfaces, a universal flash storage (UFS) device, a solid state drive (SSD), and the like.

SUMMARY

Embodiments are provided to a data storage apparatus with improved operation performance and an operating method thereof.

In an embodiment of the present disclosure, a data storage apparatus may include: a nonvolatile memory device including a plurality of memory block groups; and a controller configured to, when use of a first memory block group selected from the plurality of memory block groups is completed, select a second memory block group to be used next from among remaining memory block groups, excluding the first memory block group, of the plurality of memory block groups based on interleaving indexes of the remaining memory block groups.

In an embodiment of the present disclosure, an operating method of a data storage apparatus including a nonvolatile memory device including a plurality of memory block groups and a controller configured to control operation of the nonvolatile memory device, the method may include: determining whether or not use of a first memory block group selected from the plurality of memory block groups is completed; determining interleaving indexes of remaining memory block groups, excluding the first memory block group, of the plurality of memory block groups; and selecting a second memory block group to be used next from among the remaining memory block groups based on the interleaving indexes.

In an embodiment of the present disclosure, a semiconductor device includes: a nonvolatile memory device including a plurality of memory block groups; and a controller configured to perform an operation on at least a first memory block group and then on a second memory block group of the plurality of memory block groups. The second memory block group is selected from remaining memory block groups, excluding the first memory block group, of the plurality of memory block groups based on an interleaving index of the second memory block group relative to interleaving indexes of the remaining memory block groups. The interleaving index of each of the remaining memory block groups is indicative of usable memory blocks in that remaining memory block groups.

These and other features, aspects, and embodiments are described below.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIGS. 4A and 4B are diagrams illustrating examples of a super block interleaving index table according to an embodiment of the present disclosure;

FIG. 5 is a flowchart describing an operating method of a data storage apparatus according to an embodiment of the present disclosure;

DETAILED DESCRIPTION

Various embodiments of the present invention will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims. It is noted that reference to "an embodiment" is not necessarily to only one embodiment, and different references are not necessarily to the same embodiment(s).

The present invention is described with reference to cross-section and/or plan illustrations of embodiments of the present invention. However, the present invention is not limited to the disclosed embodiments. It will be appreciated by those of ordinary skill in the art in light of this disclosure that changes may be made to the disclosed embodiments without departing from the principles and spirit of the present invention.

Figure 1:
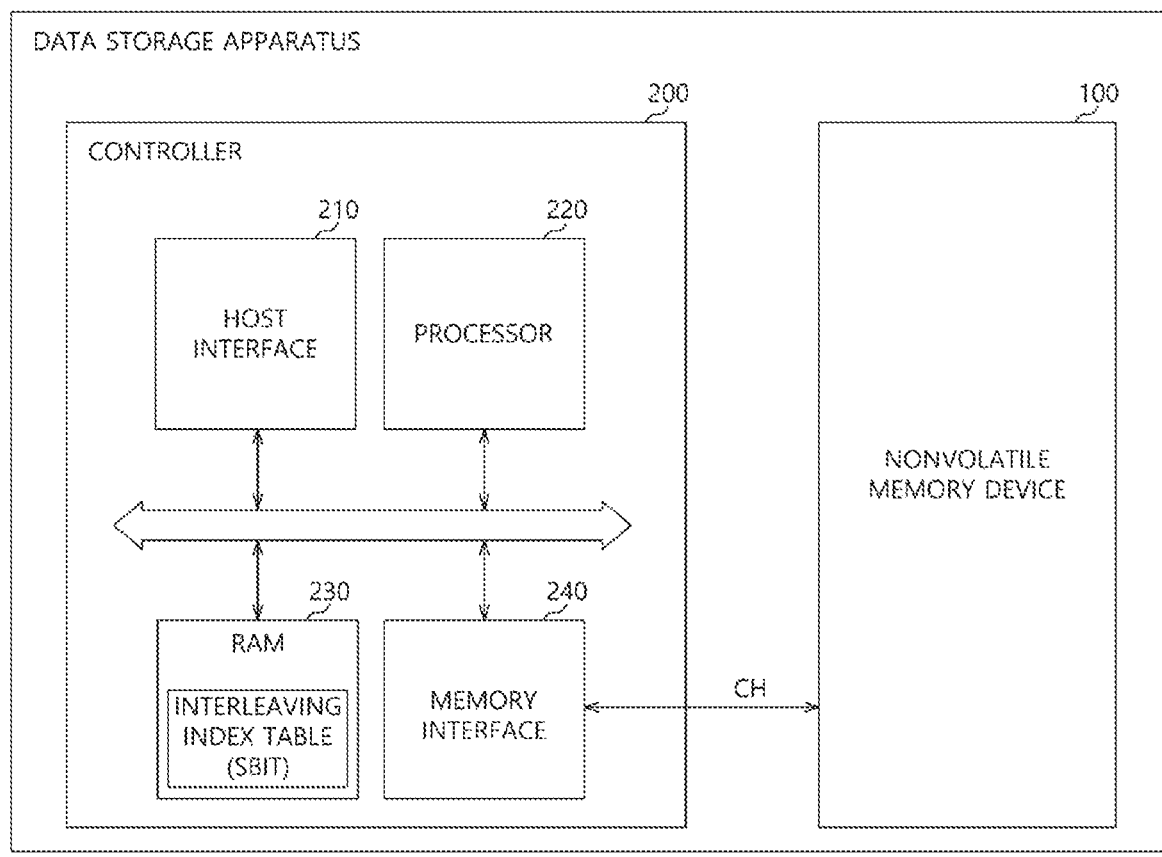
FIG. 1 is a block diagram illustrating a configuration of a data storage apparatus according to an embodiment of the present disclosure.

FIG. 1 is a block diagram illustrating a configuration of a data storage apparatus 10 according to an embodiment. In the embodiment, a data storage apparatus 10 may store data to be accessed by a host apparatus (not shown) such as a mobile phone, an MP3 player, a laptop computer, a desktop computer, a game player, a television (TV), or an in-vehicle infotainment system, and the like. The data storage apparatus 10 may refer to a memory system.

The data storage apparatus 10 may be manufactured as any one among various types of storage apparatuses according to a host interface or a host transfer protocol of a host apparatus (not shown). For example, the data storage apparatus 10 may be configured as any one of various types of storage apparatuses, such as a solid state drive (SSD), a multimedia card in the form of an MMC, an eMMC, an RS-MMC, and a micro-MMC, a secure digital card in the form of an SD, a mini-SD, and a micro-SD, a universal serial bus (USB) storage device, a universal flash storage (UFS) device, a personal computer memory card international association (PCMCIA) card type storage device, a peripheral component interconnection (PCI) card type storage device, a PCI-express (PCI-E) card type storage device, a compact flash (CF) card, a smart media card, a memory stick, and the like.

The data storage apparatus 10 may be manufactured as any one among various types of packages. For example, the data storage apparatus 10 may be manufactured as a package on package (POP), a system in package (SIP), a system on chip (SOC), a mufti-chip package (MCP), a chip on board (COB), a wafer-level fabricated package (WFP), and/or a wafer-level stack package (WSP).

Referring to FIG. 1, the data storage apparatus 10 may include a nonvolatile memory device 100 and a controller 200.

The nonvolatile memory device 100 may be operated as a storage medium of the data storage apparatus 10. The nonvolatile memory device 100 may include any one of various types of nonvolatile memory devices, such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, and a resistive random access memory (RERAM) using a transition metal compound.

In FIG. 1, the data storage apparatus 10 includes one nonvolatile memory device 100 for clarity and ease of illustration, but the data storage apparatus 10 may include a plurality of nonvolatile memory devices.

The nonvolatile memory device 100 may include a memory cell array (not shown) including a plurality of memory cells arranged in regions in which a plurality of bit lines (not shown) and a plurality of word lines (not shown) intersect. The memory cell array may include a plurality of memory blocks, and each of the plurality of memory blocks may include a plurality of pages.

Each of the memory cells in the memory cell array may be at least one among a single level cell (SLC) in which a single bit data (for example, 1-bit data) is stored, a multilevel cell (MLC) in which 2-bit data is stored, a triple level cell (TLC) in which 3-bit data is stored, and a quad level cell QLC in which 4-bit data is stored. The memory cell array may include one or more cells among the SLC, the MLC, the TLC, and the QLC. For example, the memory cell array may include memory cells having a two-dimensional (2D) horizontal structure or memory cells having a three-dimensional (3D) vertical structure.

The controller 200 may include a host interface 210, a processor 220, a random access memory (RAM) 230, and a memory interface 240.

The host interface 210 may perform interfacing between a host apparatus (not shown) and the data storage device 10. For example, the host interface 210 may communicate with the host apparatus through any one (for example, the host interface) among standard transfer protocols such as a USB protocol, a UFS protocol, an MMC protocol, a parallel advanced technology attachment (PATA) protocol, a serial advanced technology attachment (SATA) protocol, a small computer system interface (SCSI) protocol, a serial attached SCSI (SAS) protocol, a PCI protocol, and a PCI-E protocol.

The processor 220 may be configured as a micro control unit (MCU) and a central processing unit (CPU). The processor 220 may process a request transmitted from a host apparatus. To process such a request, the processor 220 may execute a code-type instruction or algorithm loaded into the RAM 230, for example, software, and control internal function blocks of the controller 200 and the nonvolatile memory device 100.

The RAM 230 may be configured as a random access memory such as a dynamic RAM (DRAM) or a static RAM (SRAM). The RAM 230 may store software executed by the processor 220. The RAM 230 may store data required for the execution of the software. For example, the RAM 230 may be operated as a working memory of the processor 220.

Figure 2:
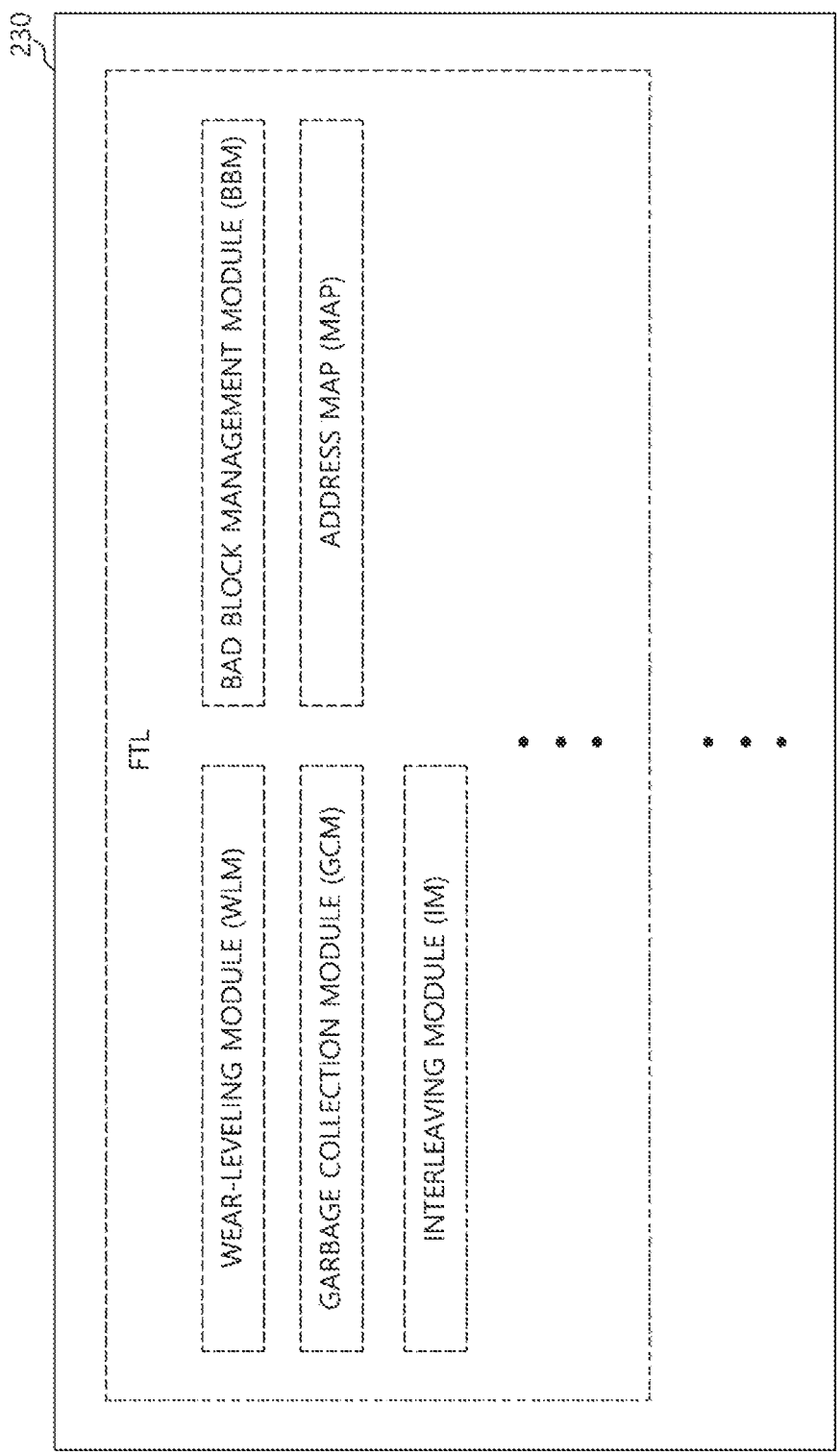
FIG. 2 is a block diagram illustrating a configuration of a nonvolatile memory device of FIG. 1.

FIG. 2 is a diagram illustrating an example of software stored in the RAM 230 that is executed by the processor 220.

When the nonvolatile memory device 100 is configured as a flash memory device, the processor 220 may control an intrinsic operation of the nonvolatile memory device 100 and execute software which refers to a flash translation layer FTL to provide device compatibility to a host apparatus. Through the execution of the flash translation layer FTL, the host apparatus may use the data storage apparatus 10 by recognizing the data storage apparatus 10 as a general data storage apparatus such as a hard disc. The flash translation layer FTL loaded into the RAM 230 may be configured as modules to perform various functions and meta data required for the driving of the modules.

Referring to FIG. 2, the flash translation layer FTL may include a wear-leveling module WLM, a bad block management module BBM, a garbage collection module GCM, an interleaving module IM, an address map MAP, and the like. However, the configuration of the flash translation layer FTL is not limited to the modules shown in FIG. 2. The flash translation layer FTL may further include modules such as a sudden power-off management module configured to prepare an unexpected power interruption.

The wear-leveling module WLM may manage wear-levels of memory blocks of the nonvolatile memory device 100. The memory cells of the nonvolatile memory device 100 may be worn out through repetition of erase operation and program operations. The worn-out memory cells may cause defects (for example, physical defects). The wear-leveling module WLM may manage the program-erase counts of the memory blocks to be similar so as to prevent a specific memory block from being worn out faster than other memory blocks. For example, the wear-leveling module WLM may manage all the memory blocks in the nonvolatile memory device 100 to maintain similar levels of wear.

The bad block management module BBM may mange defective memory blocks among the memory blocks in the nonvolatile memory device 100. As described above, defects (for example, physical defects) may occur in worn-out memory cells. Data stored in the defective memory cells may not be properly read out. Data may not be properly stored in the defective memory cells. The bad block management module BBM may manage memory blocks such that the defective memory cells are not used.

The garbage collection module GCM may collect pieces of valid data dispersedly stored in the memory blocks and move the collected pieces to one memory block and manage the nonvolatile memory device 100 to perform an erase operation on the pieces of invalid data.

The nonvolatile memory device 100 configured as a flash memory device may not support a data overwrite operation due to a structural feature. When the data is again programmed in a memory cell in a programmed state, the reliability of the data stored in the memory cell may not be guaranteed. Accordingly, an erase operation on the memory cell in the programmed state may be preferentially performed to program the data in the memory cell already in the programmed state.

Since the erase operation on the nonvolatile memory device 100 is performed in memory block units, a considerably long time for the erase operation may be required. Accordingly, when a memory cell corresponding to an address to be programmed is in a programmed state, the processor 220 may program data not through the method of erasing the corresponding memory cell and then programming the data in the memory cell but through a method of programming data in another memory cell which has been already in an erase state. The data stored in an original memory cell to be programmed may be invalid data and the data stored in the other memory cell may be valid data.

Through such an operation of the processor 220, the valid data and invalid data may be mixed in the nonvolatile memory device 100. If necessary, the processor 220 may collect the pieces of dispersed valid data in one site, for example, one memory block by driving the garbage collection module GCM and perform a series of operations which erase the pieces of invalid data. The series of operations may refer to a garbage collection operation.

The address map MAP may store address mapping information for an address conversion operation. When a host apparatus accesses the data storage apparatus 10, for example, when the host apparatus requests a read operation or a write operation, the host apparatus may provide a logical address to the data storage apparatus 10. The flash translation layer FTL may convert the logical address to an actual address of the nonvolatile memory device 100, for example, a physical address and perform the requested operation with reference to the converted physical address.

The interleaving module IM may manage a plurality of memory blocks included in one memory group in the nonvolatile memory device 100 to operate in parallel. The plurality of memory blocks included in the nonvolatile memory device 100 may be grouped according to a specific criterion and one or more memory blocks may be included in one memory block group. The memory block group may be referred to a super block. To increase the data throughput, the processor 220 may simultaneously perform a program operation and a read operation on the plurality of memory blocks included in the super block by driving or executing the interleaving module IM.

Figure 3:
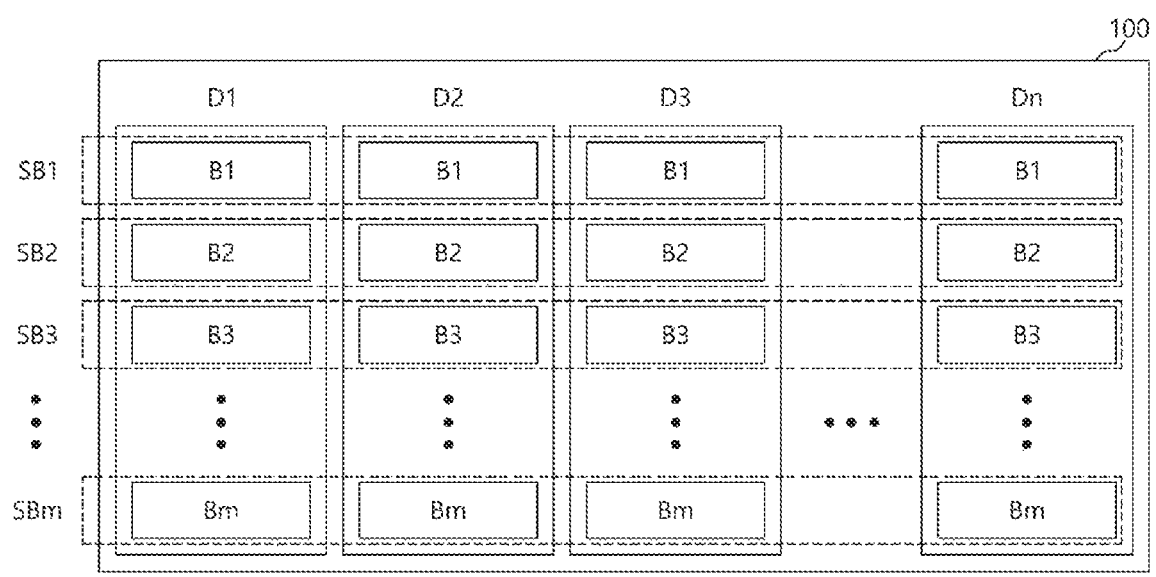
FIG. 3 is a diagram illustrating an example of software executed in a data storage apparatus according to an embodiment of the present disclosure.

FIG. 3 is a diagram illustrating a configuration of a nonvolatile memory device of FIG. 1. FIGS. 4A and 4B are diagrams illustrating examples of a super block interleaving index table (SBIT) according to an embodiment of the present disclosure.

Referring to FIG. 3, the nonvolatile memory device 100 may include a plurality of dies D1 to Dn. Each of the plurality of dies D1 to Dn may include a plurality of memory blocks B1 to Bm. Although not shown in FIG. 3, each of the dies D1 to Dn may include a plurality of planes and each of the planes may include a plurality of memory blocks. For simplification and clarity, an example that the dies D1 to Dn include no planes is illustrated in FIG. 3.

As shown in FIG. 3, first memory blocks B1 of the dies D1 to Dn may be grouped into one group, referred to as the first super block SB1. Similarly, second memory blocks B2 of the dies D1 to Dn may be grouped into a second super block SB2, and third memory blocks B3 to m-th memory blocks Bm of the dies D1 to Dn may be grouped into a third super block SB3 to a m-th super block SBm respectively.

The processor 220 may operate the memory blocks in a particular super block in parallel by driving or executing the interleaving module IM. For example, the Bm memory blocks of super block SBm may be operated in parallel.

The RAM 230 may temporarily store data to be transmitted from a host apparatus to the nonvolatile memory device 100 or data to be transmitted from the nonvolatile memory device 100 to the host apparatus. For example, the RAM 230 may be operated as a data buffer memory or a data cache memory.

A super block interleaving index table SBIT (interleaving index table) may be stored in the RAM 230. The first to m-th super blocks SB1 to SBm and their interleaving indexes may be matched and stored in the interleaving index table SBIT.

The interleaving index (IL Index) of a super block SB may refer to a degree of usable blocks or an amount of data to be processed in that super block SB. As described above, the program operation or the read operation on the plurality of memory blocks of the super block SB may be simultaneously performed in parallel.

When one or more bad blocks are included in the super block SB, the program operation or the read operation may be simultaneously performed only on remaining, non-bad memory blocks in the super block SB. Accordingly, the data throughput of the super block SB including one or more bad blocks may be less than that of the super block SB including no bad block.

When the data storage in all the memory blocks in one super block SB is completed, the processor 220 may select another super block to be used next. In an embodiment, the processor 220 may select a super block SB having a high interleaving index (for example, a super block SB having a high data throughput for the same time) as the super block SB to be used next with reference to the interleaving index table SBIT.

For example, the interleaving index table SBIT may be configured in a form including an interleaving index (IL Index) and a super block number (SB No.), in which one or more super blocks is matched with an IL Index (A, B, C, etc.) as illustrated in FIG. 4A. In another example, the interleaving index table SBIT may be configured in a form including a super block number SB No. with super block numbers SB1 to SBm and an IL Index with an index for each super block SB1 to SBm as illustrated in FIG. 4B.

A plurality of super block numbers (SB No.) may be matched with a particular interleaving index A to Z and stored in the interleaving index table SBIT having the form illustrated in FIG. 4A. This is because the interleaving indexes of the super blocks having the same number of bad blocks are the same. A corresponding IL Index may be matched to a corresponding one of the super blocks SB1 to SBm and stored in the interleaving index table SBIT having the form illustrated in FIG. 4B. The configuration of the interleaving index table SBIT is not limited to the forms illustrated in FIGS. 4A and 4B. Rather, the interleaving index table SBIT may be configured in various other forms consistent with the present disclosure.

The interleaving index table SBIT may be stored in the nonvolatile memory device 100. When the data storage apparatus 10 is powered on, the interleaving index table SBIT may be loaded into the RAM 230 from the nonvolatile memory device 100.

The interleaving indexes of the super blocks SB1 to SBm may be calculated in real time using the processor 220. The processor 220 may determine bad blocks included in each of the super blocks SB1 to SBm using the bad block management module BBM and calculate the interleaving index of each super block SB1 to SBm based on the number of bad blocks for that super block.

For example, the processor 220 may calculate the interleaving index of each super block SB1 to SBm by subtracting the number of bad blocks in that super block SB1 to SBm from the total number of memory blocks in that super block. In another example, the processor 220 may calculate the interleaving index of each super block SB1 to SB by dividing the number of bad blocks in that super block by the total number of memory blocks in that super block.

For example, as a value of the interleaving index calculated through the method of subtracting the number of bad blocks from the total number of memory blocks is increased, the number of memory blocks usable in the corresponding super block may be increased. As the value of the interleaving index calculated through the method of subtracting the number of bad blocks from the total number of memory blocks is reduced, the number of memory blocks usable in the corresponding super block may be reduced. In this example, as the interleaving index of the super block is increased, the use priority may be increased, and as the index of the super block is reduced, the use priority may be lowered.

In another example, as a value of the interleaving index calculated through the method of dividing the number of bad blocks by the total number of memory blocks is reduced, the number of memory blocks usable in the corresponding super block may be increased. As the value of the interleaving index calculated through the method of dividing the number of bad blocks by the total number of memory blocks is increased, the number of memory blocks usable in the corresponding super block may be reduced. In this example, as the interleaving index of the super block is reduced, the use priority may be heightened and as the index of the super block is increased, the use priority may be lowered.

When the data storage on all the memory blocks of an arbitrary super block is completed, the processor 220 may select a super block having a high use priority, for example, a super block having the largest number of usable memory blocks based on the interleaving indexes of the super blocks DB1 to SBm as the super block to be used next.

As described above, as the use time of memory blocks expires, worn-out memory cells become present in the nonvolatile memory device 100 and thus the number of bad blocks may increase. The processor 220 may continuously manage the increased bad blocks using the bad block management module BBM. The processor 220 may calculate the interleaving indexes of the super blocks SB1 to SBm including the increased number of bad blocks and update corresponding information stored in the interleaving index table SBIT in the RAM 230 based on the calculated interleaving indexes. The updated interleaving index table SBIT may remain stored in the nonvolatile memory device 100 when the data storage apparatus 10 is powered off.

The memory interface 240 may control the nonvolatile memory device 100 according to control of the processor 220. The memory interface 240 may refer to a memory controller. The memory interface 240 may provide control signals to the nonvolatile memory device 100. The control signals may include a command, an address, and the like for controlling the nonvolatile memory device 100. The memory interface 240 may provide data to the nonvolatile memory device 100 or receive data from the nonvolatile memory device 100. The memory interface 240 may be coupled to the nonvolatile memory device 100 through a channel CH including one or more signal lines.

FIG. 5 is a flowchart describing an operating method of a data storage apparatus according to an embodiment of the present disclosure. Such operating method of the data storage apparatus will be described with reference to FIG. 5, along with FIG. 1 to FIG. 4B.

In operation S510, the controller 200 may determine whether or not use of the first super block selected from among the plurality of super blocks (see SB1 to SBm of FIG. 3) of the nonvolatile memory device 100 is completed. The phrase "use of the first super block is completed" may mean a state in which a program operation on all the memory blocks in the first super block is completed and pieces of data are stored in all the memory cells. When the use of the first super block is completed, the controller 200 may proceed to operation S520.

When the controller 200 determines that the use of the first super block selected from among the plurality of super blocks of the nonvolatile memory device 100 is completed (that is, "Yes" at operation S510), the controller 200 may determine interleaving indexes of remaining super blocks among the plurality of super blocks SB1 to SBm of the nonvolatile memory device 100, in operation S520. The description for the interleaving indexes is given above and thus is omitted here.

In operation S530, the controller 200 may select a second super block to be used next from among the remaining super blocks based on the interleaving indexes. The selected second super block may be a super block having the lowest bad block ratio among the remaining super blocks.

Figure 6:
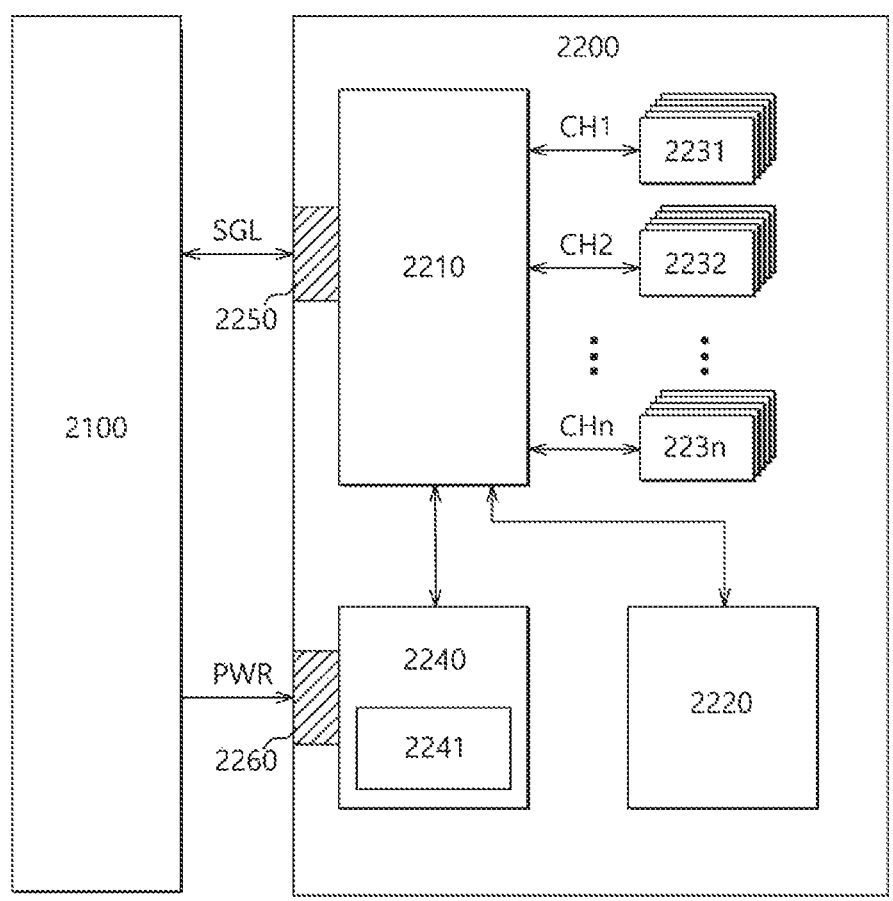
FIG. 6 is a diagram illustrating an example of a data processing system including a solid state drive (SSD) according to an embodiment of the present disclosure.

FIG. 6 is a diagram illustrating an example of a data processing system including a solid state drive (SSD)

according to an embodiment. Referring to FIG. 6, a data processing system 2000 may include a host apparatus 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to one channel may be coupled to the same signal bus and the same data bus.

The power supply 2240 may provide power PWR input through the power connector 2260 to the SSD 2200. The power supply 2240 may include an auxiliary power supply 2241. The auxiliary power supply 2241 may supply power so that the SSD 2200 is properly terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured as any of various types of connectors according to an interfacing method between the host apparatus 2100 and the SSD 2200.

Figure 7:
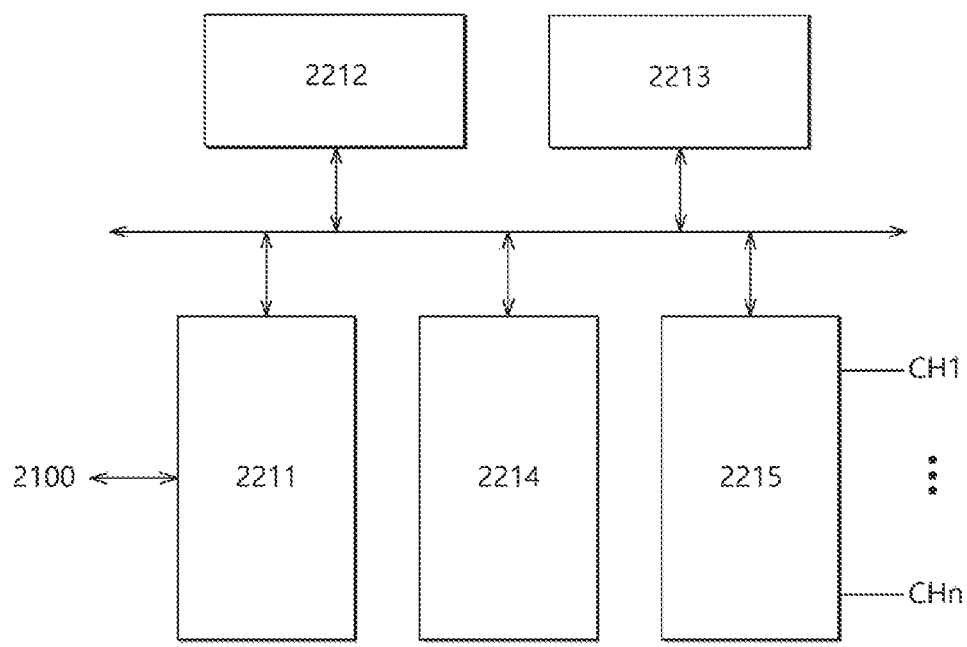
FIG. 7 is a diagram illustrating an example of a controller illustrated in FIG. 6.

FIG. 7 is a diagram illustrating an example of the controller 2210 of FIG. 6. Referring to FIG. 7, the controller 2210 may include a host interface 2211, a controller 2212, a random access memory (RAM) 2213, an error correction code (ECC) component 2214, and a memory interface 2215.

The host interface 2211 may perform interfacing between the host apparatus 2100 and the SSD 2200 according to a protocol of the host apparatus 2100. For example, the host interface 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface 2211 may perform a disc emulation function that the host apparatus 2100 recognizes the SSD 2200 as a general-purpose data storage apparatus, for example, a hard disc drive HDD.

The controller 2212 may analyze and process the signal SGL input from the host apparatus 2100. The controller 2212 may control operations of internal functional blocks according to firmware and/or software for driving the SDD 2200. The RAM 2213 may be operated as a working memory for driving the firmware or software.

The ECC component 2214 may generate parity data for the data to be transferred to the nonvolatile memory devices 2231 to 223n. The generated parity data may be stored in the nonvolatile memory devices 2231 to 223n together with the data. The ECC component 2214 may detect errors for data read from the nonvolatile memory devices 2231 to 223n based on the parity data. When detected errors are within a correctable range, the ECC component 2214 may correct the detected errors.

The memory interface 2215 may provide a control signal such as a command and an address to the nonvolatile memory devices 2231 to 223n according to control of the controller 2212. The memory interface 2215 may exchange data with the nonvolatile memory devices 2231 to 223n according to control of the controller 2212. For example, the memory interface 2215 may provide data stored in the buffer memory device 2220 to the nonvolatile memory devices 2231 to 223n or provide data read from the nonvolatile memory devices 2231 to 223n to the buffer memory device 2220.

Figure 8:
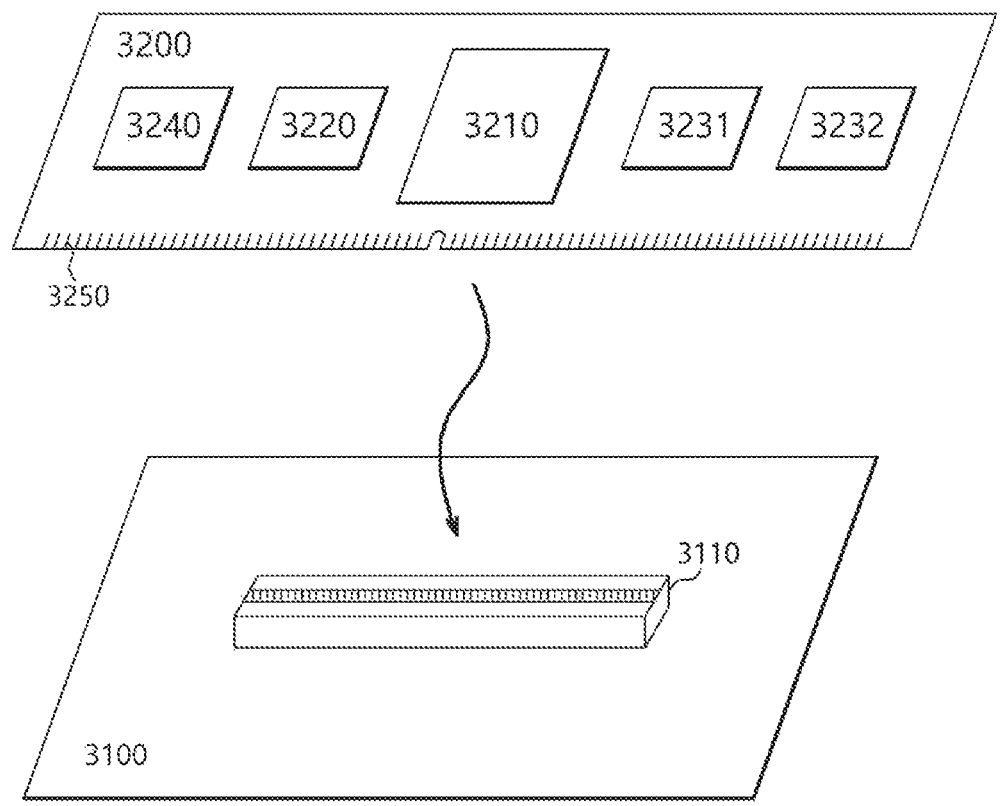
FIG. 8 is a diagram illustrating an example of a data processing system including a data storage apparatus according to an embodiment of the present disclosure.

FIG. 8 is a diagram illustrating an example of a data processing system including a data storage apparatus according to an embodiment. Referring to FIG. 8, a data processing system 3000 may include a host apparatus 3100 and a data storage apparatus 3200.

The host apparatus 3100 may be configured in a board form such as a printed circuit board (PCB). Although not shown in FIG. 8, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control overall operation of the data storage apparatus 3200. The controller 3210 may be configured to have the same configuration as the controller 2210 illustrated in FIG. 7.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any side of the data storage apparatus 3200.

Figure 9:
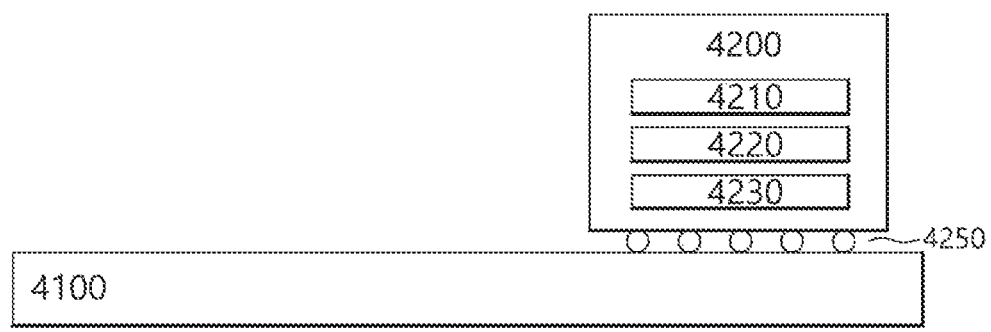
FIG. 9 is a diagram illustrating an example of a data processing system including a data storage apparatus according to an embodiment of the present disclosure.

FIG. 9 is a diagram illustrating an example of a data processing system including a data storage apparatus according to an embodiment. Referring to FIG. 9, a data processing system 4000 may include a host apparatus 4100 and a data storage apparatus 4200.

The host apparatus 4100 may be configured in a board form such as a PCB. Although not shown in FIG. 9, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control overall operation of the data storage apparatus 4200. The controller 4210 may be configured to have the same configuration as the controller 2210 illustrated in FIG. 7.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 10:
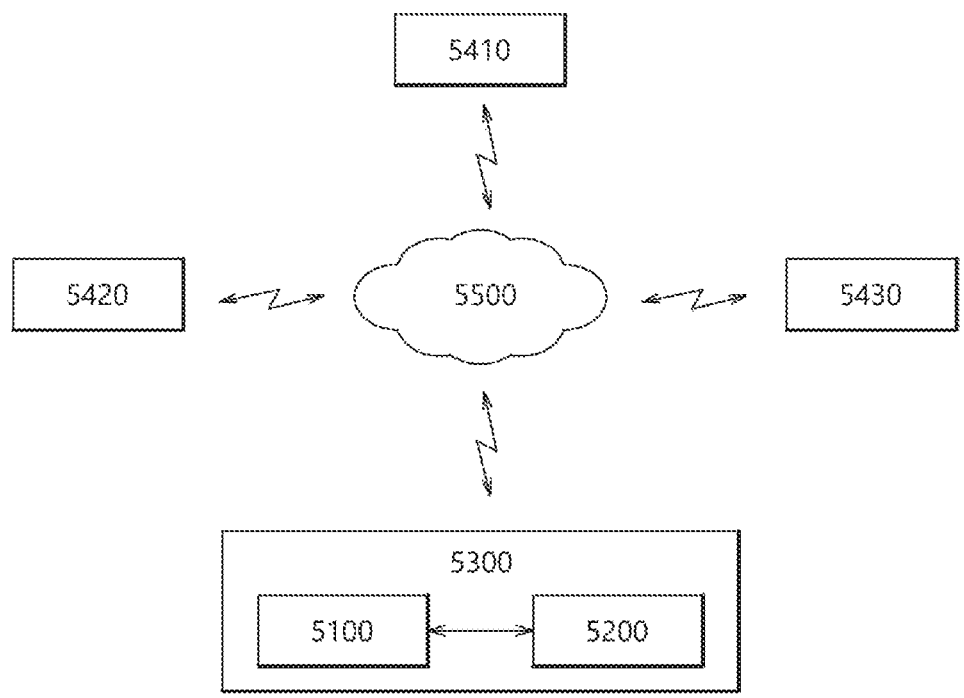
FIG. 10 is a diagram illustrating an example of a network system including a data storage apparatus according to an embodiment of the present disclosure.

FIG. 10 is a diagram illustrating an example of a network system 5000 including a data storage apparatus according to an embodiment. Referring to FIG. 10, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured as the data storage apparatus 10 of FIG. 1, the data storage apparatus 2200 of FIG. 6, the data storage apparatus 3200 of FIG. 8, or the data storage apparatus 4200 of FIG. 9.

Figure 11:
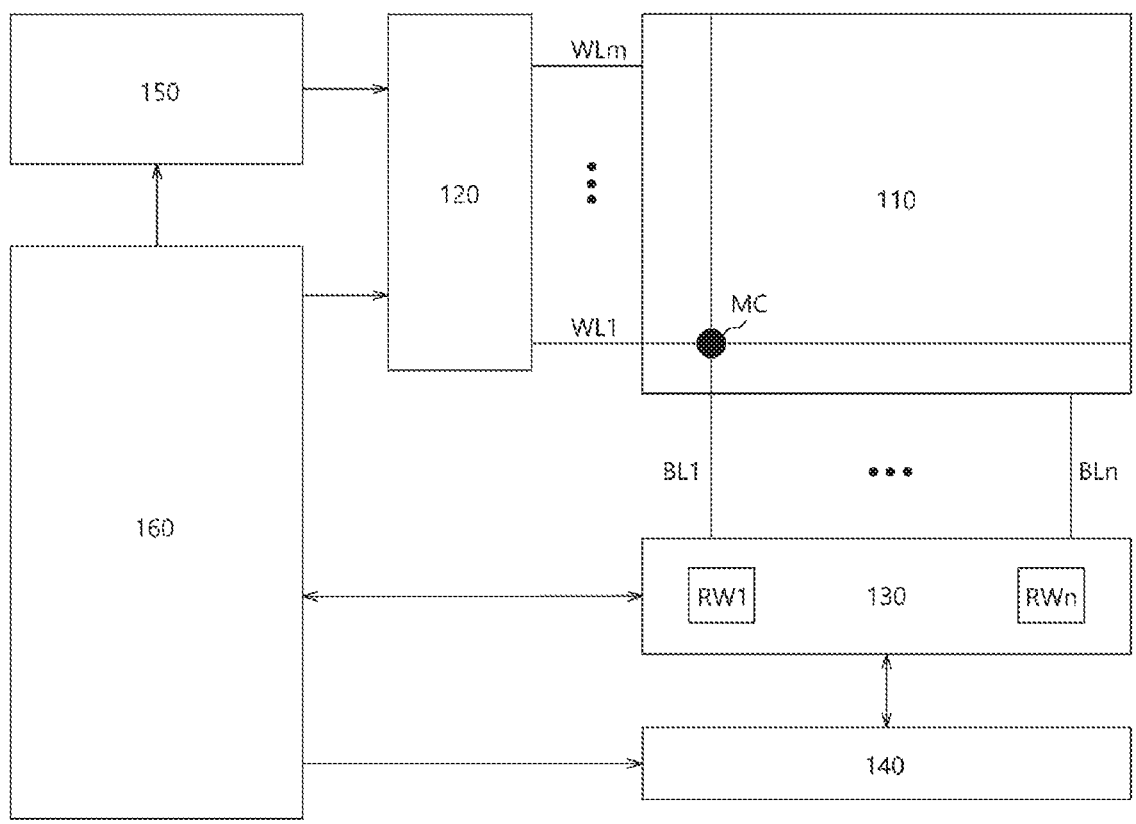
FIG. 11 is a block diagram illustrating an example of a nonvolatile memory device included in a data storage apparatus according to an embodiment of the present disclosure.

FIG. 11 is a block diagram illustrating an example of a nonvolatile memory device included in a data storage apparatus according to an embodiment. Referring to FIG. 11, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn intersect.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications that would be apparent to one skilled in the art in view of the present disclosure are intended to fall within the scope of the appended claims.

What is claimed is:

1. A data storage apparatus comprising:
   a nonvolatile memory device including a plurality of memory block groups; and
   a controller configured to, when use of a first memory block group selected from the plurality of memory block groups is completed, select a second memory block group to be used next from among remaining memory block groups, excluding the first memory block group, of the plurality of memory block groups based on interleaving indexes of the remaining memory block groups,
   wherein the controller further includes a random access memory in which an interleaving index table stores each of the plurality of memory block groups in association with a corresponding interleaving index.

2. The data storage apparatus of claim 1, wherein the nonvolatile memory device includes a plurality of dies including a plurality of memory blocks, and
each of the plurality of memory block groups is configured to include corresponding memory blocks of the dies.

3. The data storage apparatus of claim 1, wherein the interleaving indexes of the plurality of memory block groups are calculated based on ratios of bad blocks in the memory block groups respectively.

4. The data storage apparatus of claim 3, wherein the controller calculates the interleaving index of each memory block group of the plurality of memory block groups by subtracting the number of bad blocks included in that memory block group from the total number of memory blocks in that memory block group.

5. The data storage apparatus of claim 4, wherein the controller selects a memory block group having the highest interleaving index among the remaining memory block groups as the second memory block group.

6. The data storage apparatus of claim 3, wherein the controller calculates the interleaving index for each memory block group of the plurality of memory block groups by dividing the number of bad blocks in that memory block group by the total number of memory blocks in that memory block group.

7. The data storage apparatus of claim 6, wherein the controller selects a memory block group having the lowest interleaving index among the remaining memory block groups as the second memory block group.

8. The data storage apparatus of claim 1, wherein the controller calculates the interleaving indexes of the plurality of memory block groups in real time and updates the interleaving index table according to an operation result.

9. An operating method of a data storage apparatus including a nonvolatile memory device including a plurality of memory block groups and a controller configured to control operation of the nonvolatile memory device, the method comprising:
storing an interleaving index table in a random access memory, the interleaving index table storing each of the plurality of memory block groups in association with a corresponding interleaving index;
determining whether or not use of a first memory block group selected from the plurality of memory block groups is completed;
determining interleaving indexes of remaining memory block groups, excluding the first memory block group, of the plurality of memory block groups based on the interleaving index table; and
selecting a second memory block group to be used next from among the remaining memory block groups based on the interleaving indexes.

10. The method of claim 9, wherein the interleaving indexes of the plurality of memory block groups are calculated based on ratios of bad blocks in the memory block groups respectively.

11. The method of claim 10, wherein the interleaving index of each memory block group of the plurality of memory block groups is calculated by subtracting the number of bad blocks in that memory block group from the total number of memory blocks in that memory block group.

12. The method of claim 11, wherein the selecting of the second memory block group includes selecting a memory block group having the highest interleaving index from among the remaining memory block groups.

13. The method of claim 10, wherein the interleaving index for each memory block group of the plurality of memory block groups is calculated by dividing the number of bad blocks in that memory block group by the total number of memory blocks in that memory block group.

14. The method of claim 13, wherein the selecting of the second memory block group includes selecting a memory block group having the lowest interleaving index from among the remaining memory block groups.

15. A semiconductor device, comprising:
a nonvolatile memory device including a plurality of memory block groups; and
a controller configured to perform an operation on at least a first memory block group and then on a second memory block group of the plurality of memory block groups;
wherein the second memory block group is selected from remaining memory block groups, excluding the first memory block group, of the plurality of memory block groups based on an interleaving index of the second memory block group relative to interleaving indexes of the remaining memory block groups,
wherein the interleaving index of each of the remaining memory block groups is indicative of usable memory blocks in that remaining memory block groups, and
wherein the controller further includes a random access memory in which an interleaving index table stores each of the plurality of memory block groups in association with a corresponding interleaving index.

* * * * *